April 25, 1939. T. D. CAMPBELL 2,155,891
FURROW DAMMER
Filed Oct. 19, 1937
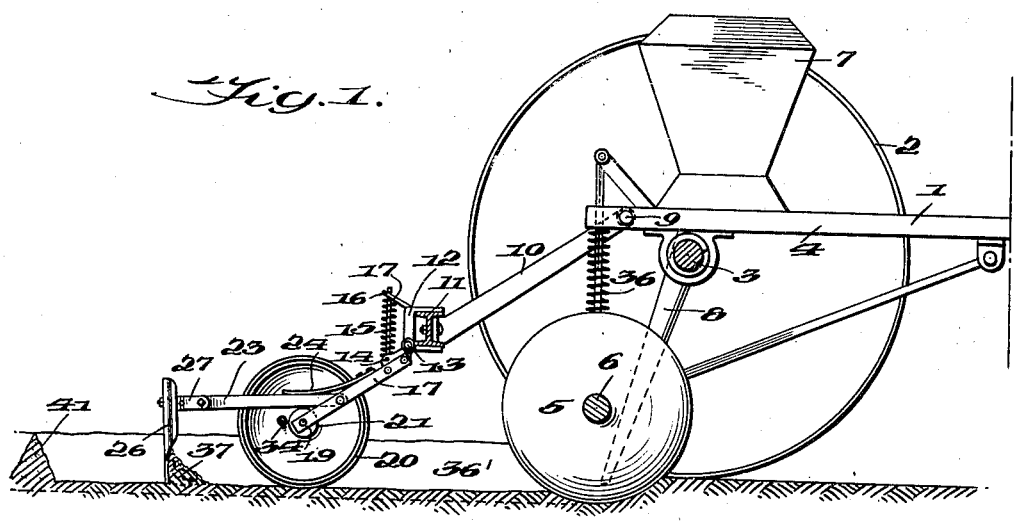
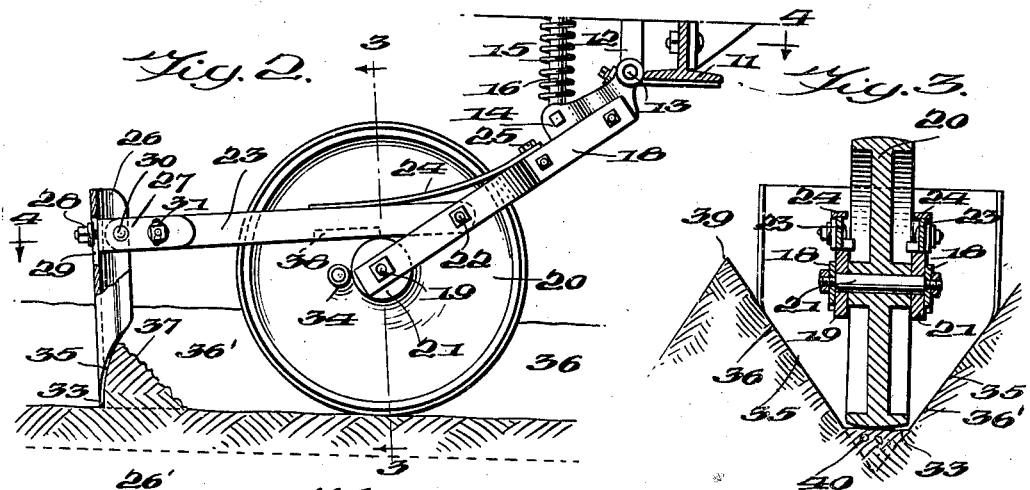
Inventor
Thomas D. Campbell,
By Mason & Mason,
Attorneys Patented Apr. 25, 1939

2,155,891

UNITED STATES PATENT OFFICE 2,155,891

FURROW DAMMER

Thomas D. Campbell, Hardin, Mont.

Application October 19, 1937, Serial No. 169,879

14 Claims. (Cl. 97—55)

At the present time the United States Government is making every effort possible to conserve moisture in the ground in certain sections of this country, and particularly throughout the Great Plains area. The purpose of this soil conservation is to retain the moisture in the ground for the crops and to prevent soil erosion. By the prevention of soil erosion a great portion of the silt which finds its way into the rivers, is eliminated. Additionally, the prevention of soil erosion will eliminate the filling of the large reservoirs now under construction or to be constructed, with silt deposits.

Farmers have experienced great difficulty in the past seven years in producing crops in the Great Plains area owing to the shortage of rainfall. Such shortage of rainfall makes it imperative to conserve all the precipitation of water in this area, and many attempts have been made in the form of listing, diversion dams, spreader dams, contour plowing, and contour seeding, in furtherance of such soil conservation. Such methods have been helpful in conserving moisture in these regions, but have not been wholly satisfactory, due to the fact that a great portion of the water which is produced by rainfall is still lost by run-off, as the water follows the furrows in plowed ground; and for the further reason that it is impossible to have all furrows or seeded rows on an absolute contour, to thus prevent run-offs, when the contour method is used.

One of the methods used in soil conservation includes the use of certain devices now on the market known as listers, which make deep furrows, several feet apart. It has been attempted to dam or retain the water every eight to ten or twelve feet, by the use of these listers. The listings thus made, however, have to be leveled off before the land can be seeded, and therefore the water is not uniformly distributed.

Also, during all such time following the leveling off of the listings, and after the seed has been planted, and during the maturing of the crop, no means exists for retaining the water in the soil, the water running off as before the listing was done. This means that during only a comparatively short period of the year is the land in such condition that it will retain the water to prevent run-offs.

The purpose of this invention therefore is to provide means for seeding and simultaneously constructing dams which will retain any moisture or water on the land during the entire time that the crop is maturing, and even subsequent to the harvesting thereof.

It is an object of this invention to provide an attachment for a deep furrow drill which, after the forming of a furrow of considerable depth, deposits the seed in the bottom of the furrow, the attachment causing the formation of a number of dams transverse to the furrow ridges and at suitable intervals.

Other objects will appear hereinafter.

In the drawing:

Figure 1 is a side elevation partly in section of a deep furrow drill having pivotally attached thereto a press wheel and a shovel attached to the press wheel support.

Figure 2 is a side elevation partly in section showing in detail the press wheel and shovel, and the means for attaching them to the drill;

Figure 3 is a vertical section on the line 3—3 of Figure 2, and

Figure 4 is a section of the structure shown in Figure 2 taken at right angles to that illustrated in Figure 2.

In the drawing the numeral 1 indicates a deep furrow drill which is supported on two or more wheels 2. The wheels 2 are mounted to rotate upon an axle 3. The drill is provided with a framework 4. Mounted for independent movement relative to the framework are one or more disks 5 mounted on an axle 6. The numeral 7 indicates a hopper or seed box. Attached to the underside of the hopper are one or more grain spouts 8. Mounted at 9 to the framework is an arm 10 which is attached to a beam 11. The beam 11 has a bracket 12 attached thereto having a pivot 13 on which an arm 14 is pivotally mounted. The arm 14 is forced downwardly by a spring 15 which is guided on a pin 16, the upper end of which bears against an arm 17 attached to the bracket 12, while the lower end of the spring bears against the arm 14. Rigidly attached to the arm 14 is a fork 18. The bifurcated ends of the fork support a shaft 19 upon which is mounted the press wheel 20. The numeral 21 indicates a plurality of rollers mounted on the shaft 19 between the ends of the fork and on either side of the press wheel.

Pivotally mounted at 22 is a bifurcated support 23. Flat springs 24 are rigidly attached by means of the bolts 25 to the fork 18, and their free ends bear upon the top of the bifurcated support so as to force the shovel 26 downwardly. The shovel 26 is provided with reenforcing flanges 26', and a slot 29. Thus the shovel may be adjusted in a vertical direction with reference to the yoke 27. After the proper mechanical adjustment has been attained, the bolt 28 is adjusted to rigidly affix the shovel wtih reference to the yoke. Said yoke 27 is mounted to swing on pivots 30, and is limited in its swinging movement by the slots 31 on the arms of the yoke. When nuts 32 are tightened, the shovel 26 may therefore be adjusted so as to be inclined from the position shown in Figure 1, to assume a position such that the flat bottom portion 33 will be either in advance of, or in the rear of the upper portion thereof.

Cams 34 are mounted at identical locations on opposite sides of the press wheel 20. The shovel is provided with inclined sides 35 of the same or of greater inclination as the sides of the furrow 36', which furrow is made by the disk 5 as it moves over the ground. Said disk is urged downwardly in the customary manner, by springs 36.

As the deep furrow drill 1 moves forward, there accumulates before the shovel 26 a certain amount of earth 37 which is held by the shovel, as shown in Figure 2, until the cams 34 rotate to such position as to engage the projections 38, and lift the bifurcated support 23 and shovel 26, supported thereby. When the shovel has cleared the pile of earth 37, which has at this time built up to about the level of the ridge 39 of the furrow, there is left an accumulation of earth or a dam. These dams will be made at various distances, depending upon the circumference of the press wheel. Two pairs of cams 34 will also operate to make twice as many dams in a given distance, as a single pair. The flat springs 24 maintain pressure upon the shovel and assist in causing a quick recovery or movement of the shovel to the bottom position, as shown in Figures 1, 2 and 3. The tension of the springs 24 gives traction to the press wheel to cause it to move constantly in contact with the ground located at the trough of each furrow. This press wheel will tend to slightly compact some earth over the seeds 40 which have been dropped in the furrow by the grain spout 8 as the furrow is made by the disks 5, and is covered by earth by the action of the disk in a well known manner. Should the ground be very loose, lugs may be attached to the press wheel to assist in affording the proper traction.

The dirt 37 is scraped almost entirely from the sides 35 of the furrow, very little, if any, being removed from the bottom of the furrow, as to remove much of this earth would uncover the grain. To insure this scraping action on the sides of the furrow rather than the bottom thereof, the shovel may be provided with inclined sides which are a little wider than the width of the furrow.

The apparatus and method herein disclosed is primarily adapted to the making of a plurality of dams during the operation of seeding a field, and is particularly applicable to contour seeding with a deep furrow drill, but the shovel attachment shown may be used on field cultivators.

I desire to be limited in the practice of my invention only to the extent set forth in the appended claims.

I claim:

1. In a deep furrow drill of the type wherein the drill is provided with a means for making deep furrows, and a grain hopper with a grain spout attached thereto and having its outlet adjacent said means, the combination with such drill of the following: a shovel attached thereto in the rear of said means with means for periodically raising and releasing the same as the drill moves over the ground, said last named means including a ground engaging member located between said furrow making means and said shovel, said member having means mounted thereon for periodically engaging said shovel.

2. In a deep furrow drill of the type wherein the drill is provided with a drilling disk for making deep furrows, and a grain hopper with a grain spout attached thereto and having its outlet adjacent said disk, the combination with such drill of the following: a pivoted arm attached to said drill, a press wheel attached to said arm, a shovel connected to said arm, and means on said press wheel for raising and releasing said shovel as the drill moves over the ground, whereby to form dams between the furrow ridges for the accumulation of deposited water, or snow.

3. In a deep furrow drill of the type wherein the drill is provided with a drilling disk for making a deep furrow, and a grain hopper with a grain spout attached thereto and having its outlet adjacent said disk, the combination with such drill of the following: a pivoted arm attached to said drill, a shovel connected to said arm, and means for raising and releasing said shovel as the drill moves over the ground comprising a press wheel located between said disk and said shovel, said press wheel having a pin eccentrically mounted thereon and adapted to raise and release said shovel, whereby to form dams between the furrow ridges for the accumulation of deposited water, or snow.

4. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a support attached to said arm, a shovel mounted on said support, and means on said press wheel for raising and releasing said shovel as the drill moves over the ground whereby to form dams between the furrow ridges for the accumulation of deposited water, or snow.

5. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a bifurcated support attached to said arm, a shovel mounted on said support, and means on said press wheel for raising and releasing said shovel as the drill moves over the ground, whereby to form dams between the furrow ridges for the accumulation of snow or water.

6. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a support attached to said arm, a shovel adjustably mounted on said support, and means on said press wheel for raising and releasing said shovel as the drill moves over the ground, whereby to form dams between the furrow ridges for the accumulation of deposited water, or snow.

7. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a support pivotally attached to said arm, a shovel mounted on said support, and means on said press wheel for raising and releasing said shovel as the drill moves over the ground, whereby to form dams between the furrow ridges for the accumulation of deposited water, or snow.

8. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a support attached to said arm, a shovel mounted on said support, and cam means on said press wheel for raising and releasing said shovel as the drill moves over the ground, whereby to form dams between the furrow ridges for the accumulation of deposited water, or snow.

9. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a bifurcated support attached to said arm, a shovel adjustably mounted on said support, and means on said press wheel for raising and releasing said shovel as the drill moves over the ground, whereby to form dams between the furrow ridges for the accumulation of deposited water, or snow.

10. In a deep furrow drill of the type wherein the drill is provided with a drilling disk for making a deep furrow, and a grain hopper with a grain spout attached thereto and having its outlet adjacent said disk, the combination with such drill of the following: an arm pivotally attached to said drill in the rear of said disk, a press wheel mounted on said arm, a support pivotally attached to said arm, a shovel adjustably mounted on said support, and cam means on said press wheel for raising and releasing said shovel as the drill moves over the ground, whereby to form dams between the furrow ridges for the accumulation of deposited water, or snow.

11. In a deep furrow drill of the type wherein the drill is provided with a drilling disk for making a deep furrow, and a grain hopper with a grain spout attached thereto and having its outlet adjacent said disk, the combination with such drill of the following: an arm attached to said drill in the rear of said disk, a press wheel mounted on said arm including a bearing shaft, a collar mounted on said shaft, a support pivotally attached to said arm and normally supported by said collar, whereby said support is in bearing relation with said collar, a shovel affixed to said arm, and means attached to said press wheel for raising said support and shovel as the drill moves over the ground, whereby to form dams between the furrow ridges for the accumulation of deposited water, or snow.

12. In a deep furrow drill of the type wherein the drill is provided with a drilling disk for making a deep furrow, and a grain hopper with a grain spout attached thereto and having its outlet adjacent said disk, the combination with such drill of the following: an arm attached to said drill in the rear of said disk, a press wheel mounted on said arm including a bearing shaft, a collar mounted on said shaft, a support pivotally attached to said arm and normally supported by said collar, whereby said support is in bearing relation with said collar, a shovel affixed to said arm, a spring bearing on said support and normally biasing said support and the shovel affixed thereto in an earthward direction, and means attached to said press wheel for raising said support and shovel as the drill moves over the ground, whereby to form dams between the furrow ridges for the accumulation of deposited water, or snow.

13. In a deep furrow drill of the type wherein the drill is provided with a drilling disk for making a deep furrow, and a grain hopper with a grain spout attached thereto and having its outlet adjacent said disk, the combination with such drill of the following: an arm attached to said drill in the rear of said disk, a press wheel mounted on said arm including a bearing shaft, a collar mounted on said shaft, a support pivotally attached to said arm and normally supported by said collar, whereby said support is in bearing relation with said collar, a shovel affixed to said arm, a spring bearing on said support and normally biasing said support and the shovel affixed thereto in an earthward direction, and cam means attached to said press wheel for raising said support and shovel as the drill moves over the ground, whereby to form dams between the furrow ridges for the accumulation of deposited water, or snow.

14. An attachment for a cultivator comprising a shovel pivotally attached thereto in the rear of the earth working implement thereof, means for supporting said shovel, whereby said shovel may scrape earth from the sides of a furrow made by the earth working implement, and means for periodically raising and releasing said shovel as the cultivator moves over the ground, said shovel supporting means including an arm, and a rotary member located between said earth working implement and said shovel and eccentrically mounted means on said rotary member adapted to periodically engage said arm, whereby to form dams between the furrow ridges for the accumulation of deposited water, or snow.

THOMAS D. CAMPBELL.